Sept. 25, 1951  E. A. ROCKWELL  2,568,900
PROPORTIONAL PRESSURE DISTRIBUTOR VALVE
Filed June 9, 1944  4 Sheets-Sheet 1
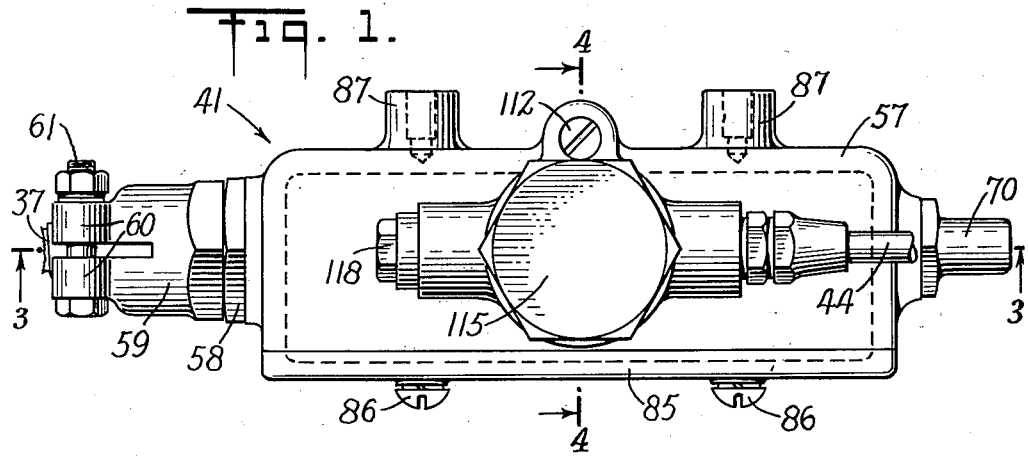
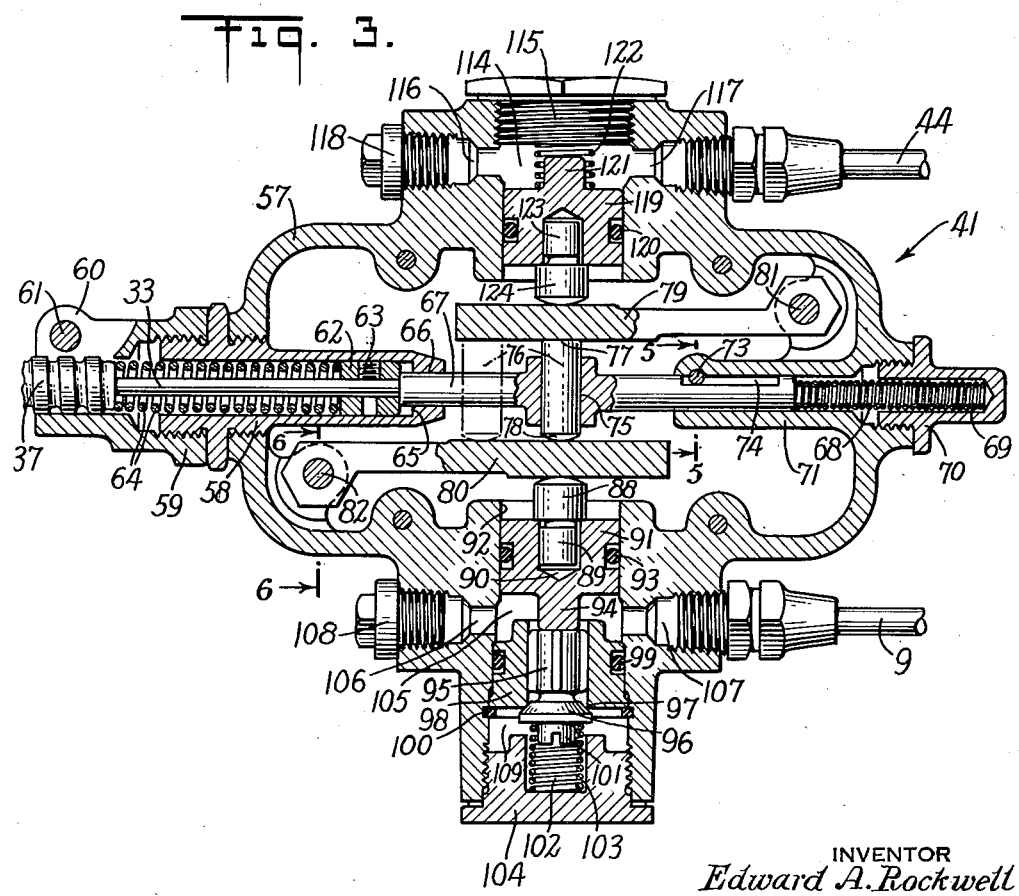
INVENTOR
*Edward A. Rockwell*
BY
*Arthur Wright*
ATTORNEY

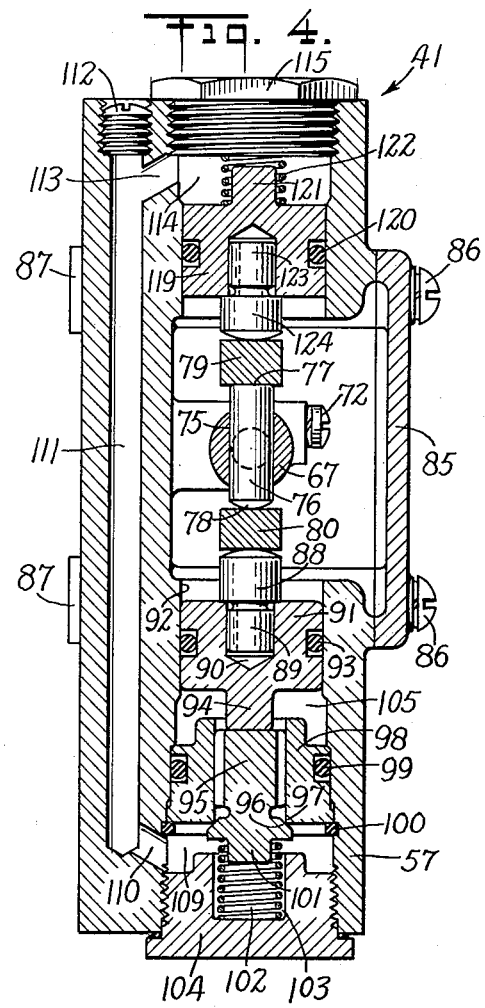
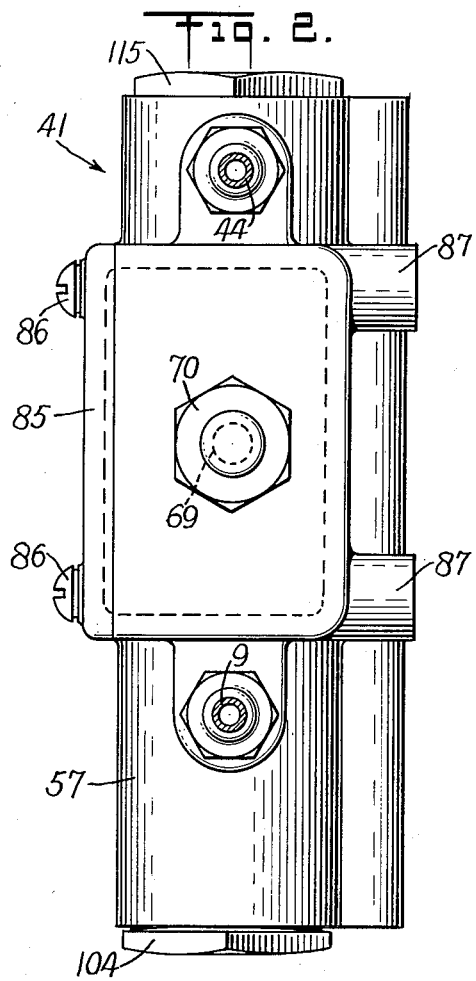
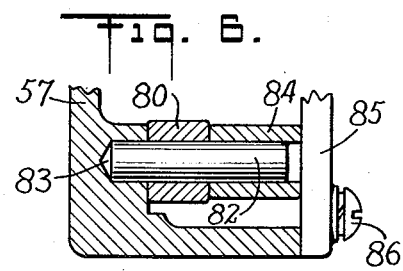
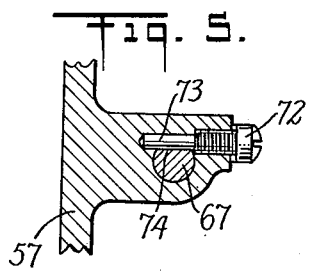

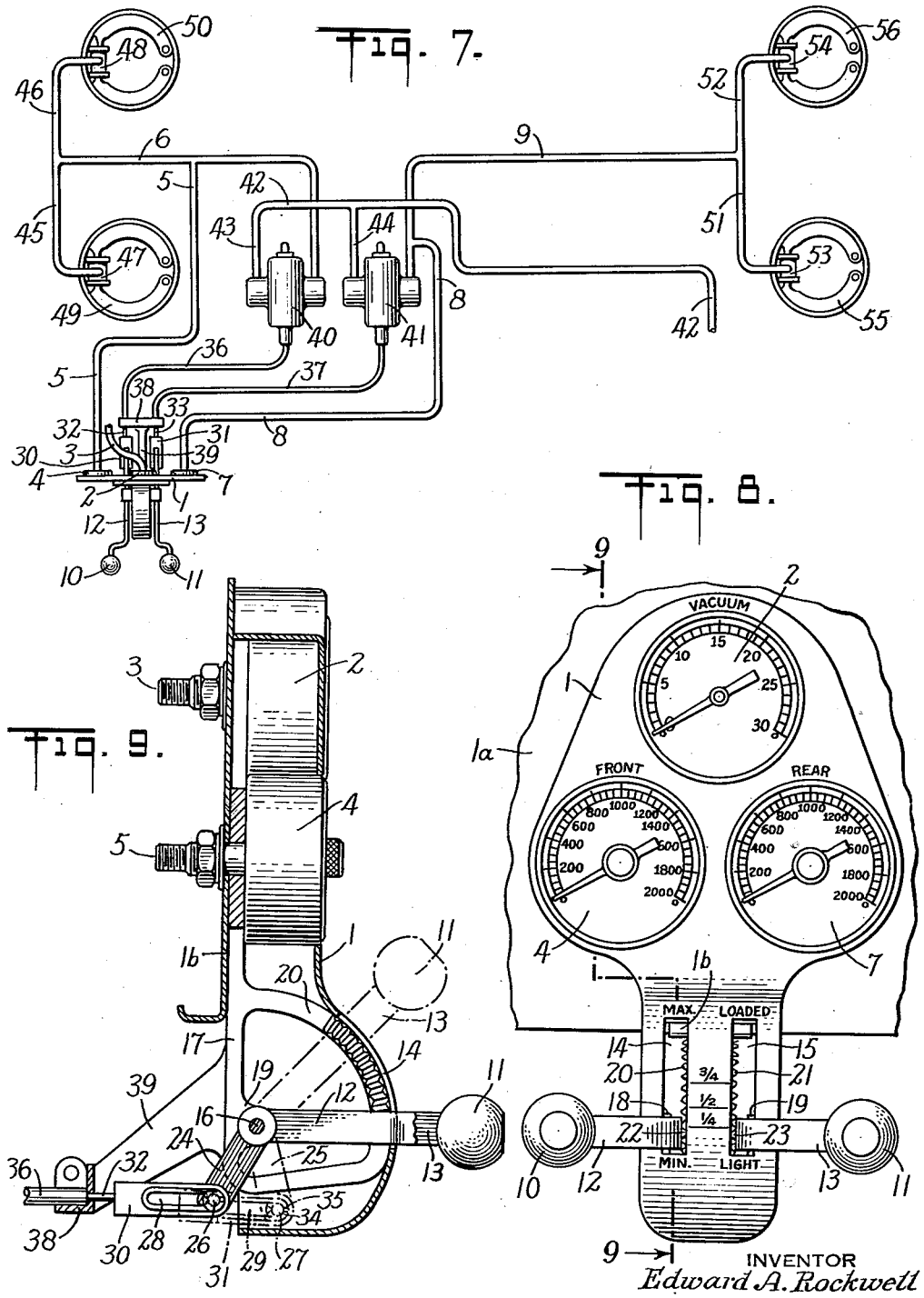

Sept. 25, 1951 E. A. ROCKWELL 2,568,900
PROPORTIONAL PRESSURE DISTRIBUTOR VALVE
Filed June 9, 1944 4 Sheets-Sheet 4

INVENTOR
Edward A. Rockwell
BY
Arthur Wright
ATTORNEY

Patented Sept. 25, 1951

2,568,900

UNITED STATES PATENT OFFICE 2,568,900

PROPORTIONAL PRESSURE DISTRIBUTOR VALVE

Edward A. Rockwell, Cleveland, Ohio

Application June 9, 1944, Serial No. 539,583

8 Claims. (Cl. 137—153.)

My invention relates particularly to an apparatus designed to provide and distribute a plurality of proportionate fluid pressures.

The object of my invention is to provide a mechanism by means of which a definite controllable ratio of a plurality of fluid pressures may be obtained. Another object is to provide a hydraulic mechanism of this character whereby proportional hydraulic pressures may be distributed for the operation of any desired mechanism, as for example the brakes of an automotive vehicle. A further object is to provide an apparatus in which preselections, or adjustments to change the ratios, of the pressures can be made at any time, as for example when the parts are under load and regardless of the pressures involved. A further object is to adjust the rate of flow of the delivered pressure fluids. Another object is to provide an effective manual operating means for the said adjustment and which is so designed as to avoid the necessity of attachment of the movable manual means to the adjustable ratio-changing element for controlling the movement of the distributor valve. Still another object is to enable such adjusted ratios to be obtained throughout the time while the pressure fluid is being supplied to the distributor valve. Another object is to apply the apparatus to vehicles, especially on busses, wherein, when operated in undesirable road conditions due to wet weather, it is desirable at times to alter the proportional braking on the front wheels in order to obtain effective steering, and on heavy trucks, due to changes in loads, it is often desirable to adjust the proportional braking on the front and rear wheels. Also on tractors with semi-trailers, in wet weather, it may be desirable to adjust the proportional braking on the tractor and trailer, or to change the ratio of braking by altering the hydraulic pressure applied to both tractor and trailer. A further object is to provide means to allow a manual setting of the proportionate pressures to be preselected, after which, when the load is taken off the apparatus, the latter automatically resets itself to the new position to deliver the reset pressures.

While my invention is capable of embodiment in many different forms, for the purpose of illustration I have shown only one form of the same in the accompanying drawings, in which—

Fig. 1 is a plan view of an apparatus made in accordance with my invention;

Fig. 2 is an end elevation of the same;

Fig. 3 is a vertical section taken on line 3—3 of Fig. 1;

Fig. 4 is a vertical section taken on line 4—4 of Fig. 1;

Fig. 5 is a vertical section of a plunger stop pin taken on line 5—5 of Fig. 3;

Fig. 6 is a vertical section of one of the lever pivots taken on line 6—6 of Fig. 3;

Fig. 7 is a diagrammatic representation of a front and rear brake controlling system made in accordance with my invention;

Fig. 8 is an elevation of the instrument panel used therewith;

Fig. 9 is a vertical section of said instrument panel on line 9—9 of Fig. 8.

Figure 10:
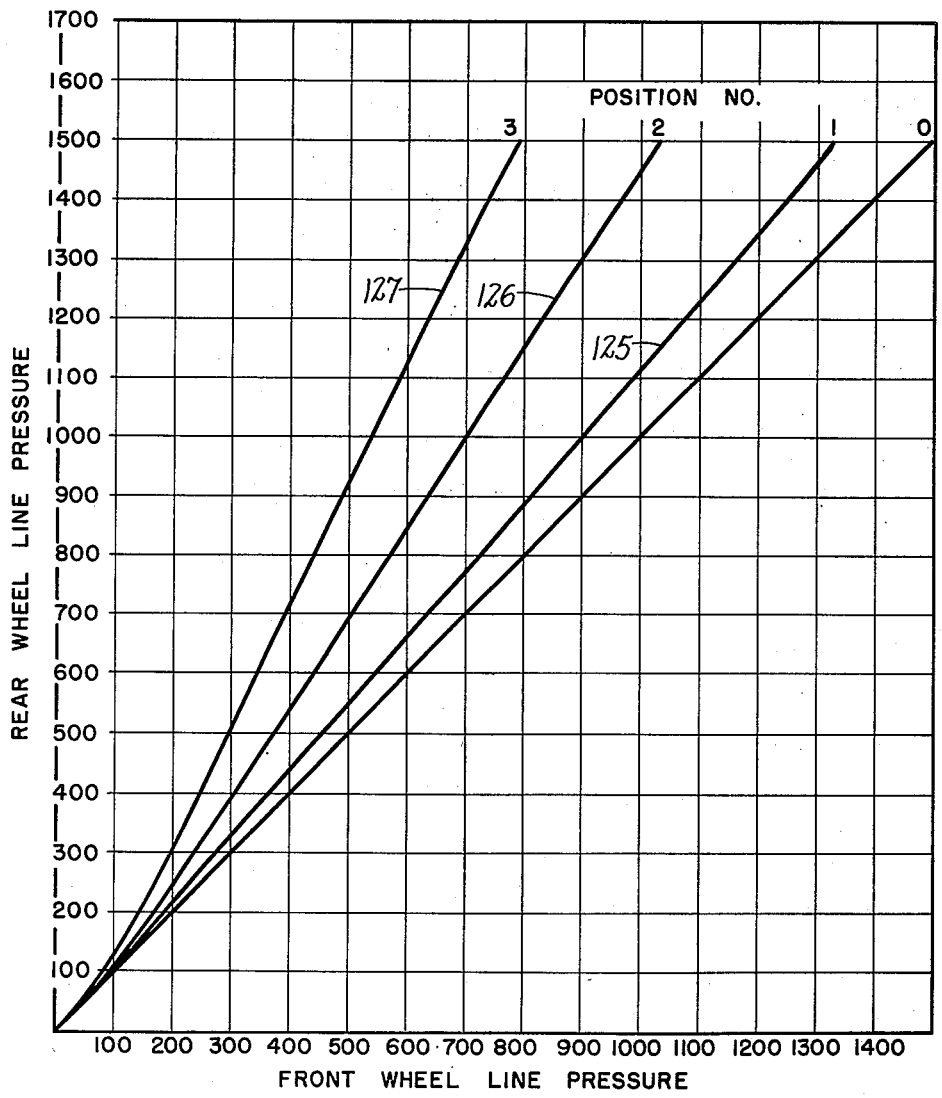
Fig. 10 is a chart showing the curves of relative pressures applied to the front and rear wheel brakes with my control system.

In the drawings, I have shown an instrument panel 1, on a dashboard 1a of an automobile, the upper part of which is triangular in shape, having a mounting plate 1b fitting on the dashboard 1a and carrying a vacuum gauge 2 connected by a pipe 3 to any suitable source of vacuum, which may be utilized in any desired way for providing a source of hydraulic fluid under pressure for operating the hydraulic brakes of my system. This source of hydraulic fluid under pressure may be provided and controlled, for example, in accordance with the apparatus shown and described in my copending application upon Intensifier for the Application of Power, Serial No. 507,227, filed October 20, 1943, now Patent No. 2,564,582. The said panel carries, also, a gauge 4 connected by a pipe 5 to a pipe 6 for operating the front wheel brakes and, also, contains a dial 7 connected by a pipe 8 to a pipe 9 for operating the rear wheel brakes. On the said panel, furthermore, there are provided a front brake handle 10 and a rear brake handle 11 which are mounted, respectively, on levers 12 and 13 passing through slots 14 and 15 in said panel 1. The levers 12 and 13 are carried by a pivot pin 16 mounted on a frame 17 which is located behind the panel 1. The said frame 17 has two ears 18 and 19 for supporting the pivot pin 16, and has two sectors 20 and 21 having racks which cooperate with buttons 22 and 23 on the levers 12 and 13, respectively, to hold them in any adjusted position. Furthermore, it will be noted that the levers 12 and 13 have lever arms 24 and 25 carrying headed pivot pins 26 and 27 which pass through slots 28 and 29 in operating members 30 and 31 which are attached, respectively, to Bowden wires 32 and 33. A washer 34 and a cotter pin 35 are carried by each of the rods 26 and 27 to hold them in place in the operating members 30 and 31 respectively. The said Bowden wires 32 and 33 pass through flexible conduits 36 and 37 which are fastened in an angularly shaped cross member 38 on an arm 39 forming a part of the frame 17. The two Bowden wires 32 and 33 lead, respectively, to proportional pressure distributors 40 and 41, both of which are constructed alike and which are connected to an inlet pipe 42 provided with a modulated hydraulic pressure fluid and which may be supplied from any suitable control apparatus, preferably manually controlled, as disclosed in detail in my copending application above referred to. It will be understood, in other words, that the pipe 42 is arranged to supply or release the modulated pressure liquid, as desired, for the control of any desired mechanism, but which in this instance is shown and described for the control of the brakes of an automotive vehicle. This pipe 42 has branch pipes 43 and 44 leading to the proportional pressure distributor valve devices 40 and 41. The proportional distributor valve 40, also, is connected to the pipe 6, which has branch pipes 45 and 46 leading to the usual wheel brake cylinders 47 and 48 controlling the operation of brake shoes 49 and 50 located on the front wheels of an automobile. Likewise, the proportional distributor valve 41 is connected to the pipe 9 which leads by branch pipes 51 and 52 to the usual wheel brake cylinders 53 and 54 controlling brake shoes 55 and 56 on the rear wheels of the automobile.

Inasmuch as the two proportional distributor valves 40 and 41 are constructed exactly alike, I have shown the detailed construction of only one of the same in Figs. 1 to 6, the same being, for example, the proportional distributor valve 41 which is connected to the flexible conduit 37 containing within the same the Bowden wire 33. The proportional distributor valve 41 has a casing 57, into one side of which there is screw-threaded a sleeve 58 having screw-threaded to the same a clamping nipple 59 provided at its outer end with ears 60 adapted to be clamped together by a bolt 61 in order to clamp within the same one end of the conduit 37. On the end of the Bowden wire 33 there is secured a sleeve 62 by means of a screw 63, which holds in place a helical spring 64 around the Bowden wire 33 within the sleeve 58. The said sleeve 62 has its forward movement limited by a shoulder 65 on the interior of the sleeve 58, the said shoulder being adjacent to an opening 66 provided to receive an adjusting rod 67 which abuts against the end of the sleeve 62. When assembling the conduit 37 and the Bowden wire 33 in the proportional distributor valve 41 it will be understood that the bolt 61 is first loosened, after which the conduit 37, with the Bowden wire 33 therein, is forced into the sleeve 58 against the adjacent end of the adjusting rod 67, after which the said bolt 61 is tightened to securely clamp the end of the conduit 37 in place. The other end of the adjusting rod 67 rests against a compressed helical spring 68 carried in a recess 69 in a screw plug 70 screw-threaded into the casing 57. This end of the adjusting rod 67 is supported within a cylindrical web 71 formed on the casing 57, and the said web is provided with a laterally directed set screw 72 (see Fig. 5) having an end 73 which acts as a stop by passing through a recess 74 formed on the side of the rod 67. The recess 74 cooperating with the stop 73 limits the movement of the adjusting rod 67 and, also, prevents the said rod 67 from turning. Furthermore, the said rod 67 has located at the center thereof a vertical hole 75 carrying loosely within the same a pin 76 having an upper flat surface 77 and a lower rounded end 78. The flat end 77 provides stability for the adjusted position of the pin 76. The rod 67, accordingly, can be moved into different adjusted positions to the right or left, as desired, according to the proportional pressures desired to be transmitted by the apparatus. For this purpose, the laterally adjustable pin 76 is carried between the faces of an upper valve lever 79 and a lower valve lever 80 which are carried on pivot pins 81 and 82, respectively, supported within the casing 57. Both of these pivotal supports are constructed the same, and by way of example I have shown, in Fig. 6, a cross-section of the support for the pivot pin 82. One end of the pin 82 is carried in a recess 83 in the casing 57 so as to support the valve lever 80, and the other end of the pin 82 carries a sleeve 84 which is maintained in place by a cover plate 85 attached by screws 86 to the side of the casing 57. On the other side, said casing 57 has a plurality of screw holes 87 for attachment to the proportional distributor valve 41 to any desired support on the chassis of the automobile.

This valve lever 80, on its lower face, is in contact with a rounded head 88 on a fluted rod 89 supported in a recess 90 in a plunger 91 carried in a cylinder 92 within the casing 57. The said plunger 91 has an annular rubber seal 93 around its periphery and is, also, provided with a centrally located projection 94 extending downwardly into contact with a fluted valve stem 95 on a tapered valve 96 which seats against a valve seat 97 on a removable valve sleeve 98 which is provided with a peripheral rubber seal 99 and which is held in place by a split ring 100 located within the cylindrical passageway 92. The valve stem 95, beyond the conical valve 96, has a reduced end 101 for positioning thereon a helical spring 102, located in a recess 103 within a screw plug 104 screw-threaded in said casing 57 for seating the valve 96 normally. Above the sleeve 98 there is a chamber 105 for receiving the hydraulic fluid under pressure, which is adapted to be admitted by the conical valve 96. The said chamber 105 has two outlet ports 106 and 107, the port 106 being normally closed by a screw plug 108, while the port 107 is connected to the pipe 9 which leads to the rear wheel brakes. Beneath the conical valve 96 there is an annular chamber 109 which receives the pressure liquid from an inclined passageway 110 leading to a vertical passageway 111 closed at the top by a plug 112 and which communicates with an inclined passageway 113 leading to a chamber 114 closed by a screw plug 115 in the upper portion of the casing 57. This chamber 114 has two ports 116 and 117, the latter of which, port, 117, is connected to the pipe 44 while the former, port 116, in the apparatus as shown herein, is normally closed by a screw plug 118, inasmuch as in the apparatus as shown I have provided the proportional distributor valve 40 for operating the front brakes and the proportional distributor valve 41 for operating the rear wheel brakes. However, it will be understood that instead of having a separate proportional distributor valve for controlling each of said sets of brakes, a single proportional distributor valve 41 could be used for controlling both sets of brakes, front and rear, by merely removing the plug 118 and connecting the port 116 to the front wheel brakes by means of the pipe 6. Within the chamber 114, furthermore, there is a plunger 119, having a peripheral rubber seal 120, similar to the plunger 91. This plunger 119 has on its upper face a projection 121 to act as a guide for a helical spring 122, which rests against the plug 115. The said spring 122 tends to force the plunger 119 downwardly by overcoming the friction of the seal 120 and said plunger 119 carries within the same a fluted rod 123 having thereon a rounded head 124 rests against the upper face of the valve lever 79. The lower face of the valve lever 79 rests against the flat surface 77 on the upper end of the pin 76.

In the operation of my apparatus, it will be understood that when the modulated pressure is being applied through the pipe 42, the valves 96 will become unseated, respectively, by the pressure exerted through the plungers 119, 91 and pin 76, and the pressures from the hydraulic fluid delivered to the front wheel brake cylinders 47 and 48 are registered on the dial 4 while the pressures on the rear wheel brake cylinders 53 and 54 are registered on the dial 7. These two pressures are not only controllable by the manually modulated pressure received from the pipe 42, in which the pressures exerted on the brake cylinders are reactive back onto the manual means to exert a "feel" thereon, but are individually controllable, respectively, by the handles 10 and 11, which can be moved to adjust the desired pressures for the front and rear wheel brakes, respectively, and so as to remain in their adjusted position by reason of the racks or sectors 20 and 21. The adjustment of each of the Bowden wires 32 and 33 connected thereto results in the desired adjustment of the position of the vertical pin 76, which is displaceable between the oppositely pivoted valve levers 79 and 80 so as to obtain the desired ratio, or even a 1 to 1 ratio, and irrespective of whether or not the pistons 91 and 119 are the same size as each other. However, as the end of the Bowden wire 33 acts as an adjustable abutment not fastened to the rod 67, owing to the slot 28 and to the springs 64 and 68 when the load from the upper and lower valve levers 79 and 80 is released from the pin 76 the rod 67 will move to the left against the wire 33, due to the spring 68, so as to move the wire 33 as far as the slot 28 will permit, when the pin 76 is free to move, or the rod 67 will be moved to the right by the spring 64, which is stronger than the spring 68, when the manual adjustment is made in this direction. This permits preselection of the ratio in either direction without strain on or possible breakage of the Bowden wire. By this means, in each of the two proportional distributor valves 40 and 41, a definite adjusted proportional pressure is obtainable and preselectable in each of the pipes 6 and 9 with regard to the pressure received through the pipe 42. In this way an adjusted constant differential of pressures between the front wheel brakes and the incoming pressure in the pipe 42 can be secured, and the same is true with regard to the rear wheel brakes, but different adjusted differentials for the front wheel brakes and the rear wheel brakes, respectively, are readily obtainable. The adjusted differential pressure in each of these instances is, of course, due to the position of the pin 76 between the adjacent faces of the valve levers 79 and 80, so that the pressure delivered from the outlet port 107 is an adjusted constant differential with regard to the pressure in the inlet port 117 due to the ratios in the effective lever lengths of the valve operating levers 79 and 80. Also, it will be understood, of course, that the manual modulation of the fluid pressure in the pipe 42 controls the position of the front and rear wheel brakes while at the same time maintaining the adjusted differential between the incoming pressure and the front wheel brakes and between the incoming pressure and the rear wheel brakes. In this way, also, the proportional relationship may be maintained between the front wheel brakes and the rear wheel brakes. For example, the manually controlled and modulated pressure liquid received by the pipe 42 immediately acts on the plungers 119 of the distributor valves 40 and 41 and thereupon immediately establishes, by means of the levers 79 and 80, the pin 76, plunger 91, and the valve 96, 97, a definite differential of pressures in the chambers 114 and 105, inasmuch as the pressure liquid from the chamber 114 is transmitted through the passageways 113, 111 and 110 to the chamber 109 and thence past the valve 96 to the chamber 105, the position of the valve 96 being controlled in this way to maintain the adjusted differential of pressures for the front and rear wheel brakes. Upon any relaxation of the pressure in the pipe 44, this will cause the pressure in the chamber 105 of the distributor valves 40 and 41 to exceed the pressure in the chamber 109, thus causing at first an increase of volume by lifting the plunger 91 away from its valve 96 and then the escape, to that extent, of the liquid downwardly past the valve 96, 97, upwardly through the passageway 111, and thence to the chamber 114 and the port 117, thus relieving the pressure and releasing the brakes on the front and rear wheels. As above stated, when the load is released the pin 76 is free to move, and, accordingly, the valve 96 can become seated by the spring 102, as shown in Fig. 3, the force of which is just sufficient for this purpose.

As pointed out above, however, it will be obvious that a single one of the proportional distributor valves 40 and 41 may be used for controlling both the front and rear wheel brakes so as to maintain the definite adjusted differential of pressures applied thereto and for which purpose the plug 118 will be removed so as to connect the port 116 to the pipe 6 for controlling the front wheel brakes while the pipe 9 would still be connected to the rear wheel brakes. In that event, the single handle 11 would control the differential of both the front and rear wheel brakes and the other proportional distributor valve 40 and its connections would be eliminated.

In Fig. 10 I have shown a chart giving curves 125, 126 and 127 showing the line pressures for the front and rear wheel brakes at three different adjustments of the differential pressures and throughout the range of rear wheel line pressures from 0 to 1500 lbs. per square inch. It will be noted that these three curves 125, 126 and 127 are substantially straight line curves. This shows the establishment of an adjusted constant differential pressure relationship between the front and rear wheel line pressures with the size of the plungers 91 and 119 in Fig. 3, but if larger plunger sizes are used a steeper curve on the diaphragm, Fig. 10, can be obtained. There is also a differential volume relationship of the plungers 119 and 91 due to the adjusted position of the pin 76 and the variable leverages of the levers 79 and 80 resulting therefrom.

While I have described my invention above in detail I wish it to be understood that many changes may be made therein without departing from the spirit of the same.

I claim:

1. A proportional pressure distributor means having a source of supply thereto of a controlling hydraulic pressure liquid adapted to be controlled at will, a connection for delivering a controlled hydraulic liquid, a preselection means, constructed to be set in a fixed position initially, a pair of lever arms subject to the controlling and delivered pressures, respectively, and an interposed connector between said lever arms normally out of contact with said preselection means for adjusting the delivered pressure when the load is being released, adapted to maintain a constant differential of said pressures throughout the range of said controlling hydraulic pressure.

2. A proportional pressure distributor means having a source of supply thereto of a controlling hydraulic pressure liquid adapted to be controlled at will, a connection for delivering a controlled hydraulic liquid, and an adjusting means for adjusting the delivered pressure, having an adjustable ratio determining element and a manually operable preselection ratio setting device having a lost-motion connection to said element.

3. A proportional pressure distributor means having a source of supply thereto of a controlling hydraulic pressure liquid, including a chamber receiving a hydraulic liquid, adapted to be controlled at will, a delivery passage for work performance having a connection provided with a delivery and return valve leading to said chamber for delivering and returning to said chamber a controlled hydraulic liquid, and an adjusting means in said connection for adjusting the delivered pressures, adapted to maintain a constant differential of said pressures with regard to the received hydraulic liquid throughout the range of said controlling hydraulic pressure, the delivered adjusted hydraulic pressures being reactive against the controlling hydraulic pressure.

4. A proportional pressure distributor means having a source of supply thereto of a controlling hydraulic pressure liquid, including a pipe receiving a hydraulic liquid, adapted to be controlled at will, a delivery passage for work performance having a connection provided with a valve leading to said pipe for delivering a controlled hydraulic liquid at one pressure, a second delivery passage for another work performance having a connection provided with a second valve leading to said second passage for delivering another hydraulic pressure, and adjusting means in each of said valve connections for adjusting the respective delivered pressures, adapted to maintain a constant differential of each of said delivered pressures with regard to the received hydraulic liquid throughout the range of said controlling hydraulic liquid pressure, the said adjusting means comprising two separate proportional pressure distributor devices having separate manual adjusting levers located adjacent to each other with a single scale indicating the relative adjustments of said differential pressures.

5. A proportional pressure distributor means having a source of supply thereto of a controlling hydraulic pressure liquid, including a pipe receiving a hydraulic liquid, adapted to be controlled at will, a delivery passage for work performance having a connection provided with a valve leading to said pipe for delivering a controlled hydraulic liquid at one pressure, a second delivery passage for another work performance having a connection provided with a second valve leading to said second passage for delivering another hydraulic pressure, and adjusting means in each of said valve connections for adjusting the respective delivered pressures, adapted to maintain a constant differential of each of said delivered pressures with regard to the received hydraulic liquid throughout the range of said controlling hydraulic liquid pressure, the delivered adjusted hydraulic pressures from both said connections being reactive in said pipe to produce a single reaction against the controlling hydraulic pressure, the said adjusting means comprising two separate proportional pressure distributor devices having separate manual adjusting levers located adjacent to each other with a single scale indicating the relative adjustments of said differential pressures.

6. A proportional pressure distributor means having a source of supply thereto of a controlling hydraulic pressure liquid, including a chamber receiving a hydraulic liquid, adapted to be controlled at will, a delivery passage for work performance having a connection provided with a valve and valve seat leading to said chamber for delivering and releasing through said valve seat a controlled hydraulic liquid, and an adjusting means in said connection for adjusting the delivered pressures, adapted to maintain a constant differential of said pressures with regard to the received hydraulic liquid throughout the range of said controlled hydraulic pressure, the delivered adjusted hydraulic pressures being reactive against the controlling hydraulic pressure, said adjusting means comprising a plunger and a chamber for the plunger in communication with the valve and having a freely open communication with the delivery connection so as to increase the volume of the plunger chamber by the movement of said plunger away from the valve when the controlling hydraulic pressure is being released.

7. A proportional pressure distributor means having a source of supply thereto of a controlling hydraulic pressure liquid, including a chamber receiving a hydraulic liquid, adapted to be controlled at will, a delivery passage for work performance having a connection provided with a valve and valve seat leading to said chamber for delivering and releasing through said valve seat a controlled hydraulic liquid, and an adjusting means in said connection for adjusting the delivered pressures adapted to maintain a constant differential of said pressures with regard to the received hydraulic liquid throughout the range of said controlling hydraulic pressure, said adjusting means comprising an adjustable fulcrum in contact with two movable lever arms connected together at said fulcrum in the form of a movable slidable pivot carried by a movable member, a plunger and a chamber for the plunger in communication with the valve and having a freely open communication with the delivery connection so as to increase the volume of the plunger chamber by the movement of said plunger away from the valve when the controlling hydraulic pressure is being released.

8. A proportional pressure distributor means having a source of supply thereto of a controlling hydraulic pressure liquid, including a chamber receiving a hydraulic liquid as a single source of pulsating pressure having therein a piston, adapted to be controlled at will, a delivery passage for work performance, provided with a valve and valve seat, having a connection leading to said chamber and said piston for delivering and releasing through said valve seat a controlled hydraulic liquid, and an adjusting means in said connection cooperating with said piston for adjusting the delivered pressures, adapted to maintain a constant differential of said pressures with regard to the received hydraulic liquid throughout the range of said controlled pulsating hydraulic pressure, the delivered adjusted hydraulic pressures being reactive against the controlling hydraulic pressure, said adjusting means comprising a plunger and a chamber for the plunger in communication with the valve and having a freely open communication with the delivery passage so as to increase the volume of the plunger chamber by the movement of said plunger away from the valve when the controlling hydraulic pressure is being released.

EDWARD A. ROCKWELL.

REFERENCES CITED

The following references are of record in the file of this patent:

UNITED STATES PATENTS

| Number | Name | Date |
|---|---|---|
| 1,536,508 | Lilja | May 5, 1925 |
| 1,558,529 | Wunsch | Oct. 27, 1925 |
| 2,120,681 | Ryder | June 14, 1938 |
| 2,170,086 | McCune | Aug. 22, 1939 |
| 2,244,686 | Garrison | June 10, 1941 |
| 2,313,991 | Fitch | Mar. 16, 1943 |